(12) United States Patent
Klingman et al.

(10) Patent No.: US 11,719,715 B2
(45) Date of Patent: *Aug. 8, 2023

(54) VELOCITY MEASURING DEVICE

(71) Applicants: Edwin Eugene Klingman, San Gregorio, CA (US); Jonathan Wilcox, Guinda, CA (US)

(72) Inventors: Edwin Eugene Klingman, San Gregorio, CA (US); Jonathan Wilcox, Guinda, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/702,745

(22) Filed: Mar. 23, 2022

(65) Prior Publication Data
US 2022/0252632 A1    Aug. 11, 2022

Related U.S. Application Data

(63) Continuation of application No. 17/124,525, filed on Dec. 17, 2020, now Pat. No. 11,313,873.

(60) Provisional application No. 62/951,656, filed on Dec. 20, 2019.

(51) Int. Cl.
*G01P 3/36* (2006.01)

(52) U.S. Cl.
CPC ............................ *G01P 3/36* (2013.01)

(58) Field of Classification Search
CPC ..................... G01P 3/36; G01P 3/68
See application file for complete search history.

(56) References Cited

U.S. PATENT DOCUMENTS

2011/0098073 A1*  4/2011  Park ............ H04W 56/0035
                                          455/509

* cited by examiner

*Primary Examiner* — Manuel A Rivera Vargas

(57) ABSTRACT

Disclosed herein is a velocity measuring device to be used in a moving frame to determine the velocity of the moving frame. At least one beam of light is emitted from a site in the moving frame and travels to a mirror disposed in the moving frame and back to the site at which the emission occurred, after which the beam is detected by a light beam detector. By measuring the round trip time of the light beam from emission to detection, a factor gamma can be determined from which the velocity of the moving frame can be computed.

20 Claims, 5 Drawing Sheets

VELOCITY MEASURING DEVICE

CROSS-REFERENCE TO RELATED APPLICATIONS

This application (1) claims the benefit of and (2) incorporates by reference in its entirety into this application, U.S. application Ser. No. 17/124,525 titled VELOCITY MEASURING DEVICE, filed on Dec. 17, 2020, which application claims priority to U.S. application Ser. No. 62/951,656, titled VELOCITY MEASURING DEVICE, filed on Dec. 20, 2019.

BACKGROUND

Special relativity relies on two premises, (1) that the laws of physics are the same in all inertial frames, and (2) that the speed of light is constant in all frames of reference. These premises lead to concepts such as the relativity of simultaneity, which states that events that are simultaneous in one inertial frame are not simultaneous in another inertial frame stemming from the idea that a moving object carries its own time. However, these consequences lead to paradoxes. A new interpretation of the above premises is needed if physics is to regain a footing in physical reality.

SUMMARY

The new interpretation returns to the concept of universal simultaneity. The interpretation introduces the theory of energy-time. The energy-time theory rests in part on the notion that a simultaneity detector can be used to determine the velocity of an inertial frame.

One embodiment provides a method for determining a velocity of an inertial frame in the inertial frame moving with respect to a reference frame. The method includes triggering at a first instant in time the emission of a light beam from a site on a substrate in the inertial frame, where the site is at a position halfway between the ends of the substrate. A mirror is disposed on the substrate at one end of the substrate. The emitted light beam traverses a path towards the mirror, detecting a second instant in time at which the emitted light beam returns to the site after being reflected from the mirror, determining a first time interval which has elapsed between the first and second instants in time, computing a ratio of the first time interval to a second time interval, and calculating the velocity based on the ratio.

Further embodiments include an apparatus configured to carry out one or more aspects of the above method. Further embodiments also include using three velocity-measuring devices, mutually orthogonal, to measure velocity in three orthogonal directions. Each device measures velocity in the direction of the physical path of the light beams in each device. Yet a further embodiment includes a single device that can be oriented in three mutually orthogonal directions to measure velocity sequentially in the three directions.

One advantage of the embodiments described herein is that the device provides a way of measuring velocity without the use of a global positioning system (GPS) or a gyroscope. Another advantage is that the device can be used as a backup system as well as for calibration of a primary velocity measuring system for large ships such as carriers or tankers and large airplanes such as 747s and 380s. Yet another advantage is that a measurement can be repeated many times for a system whose velocity continuously varies.

DETAILED DESCRIPTION

Figure 1A:
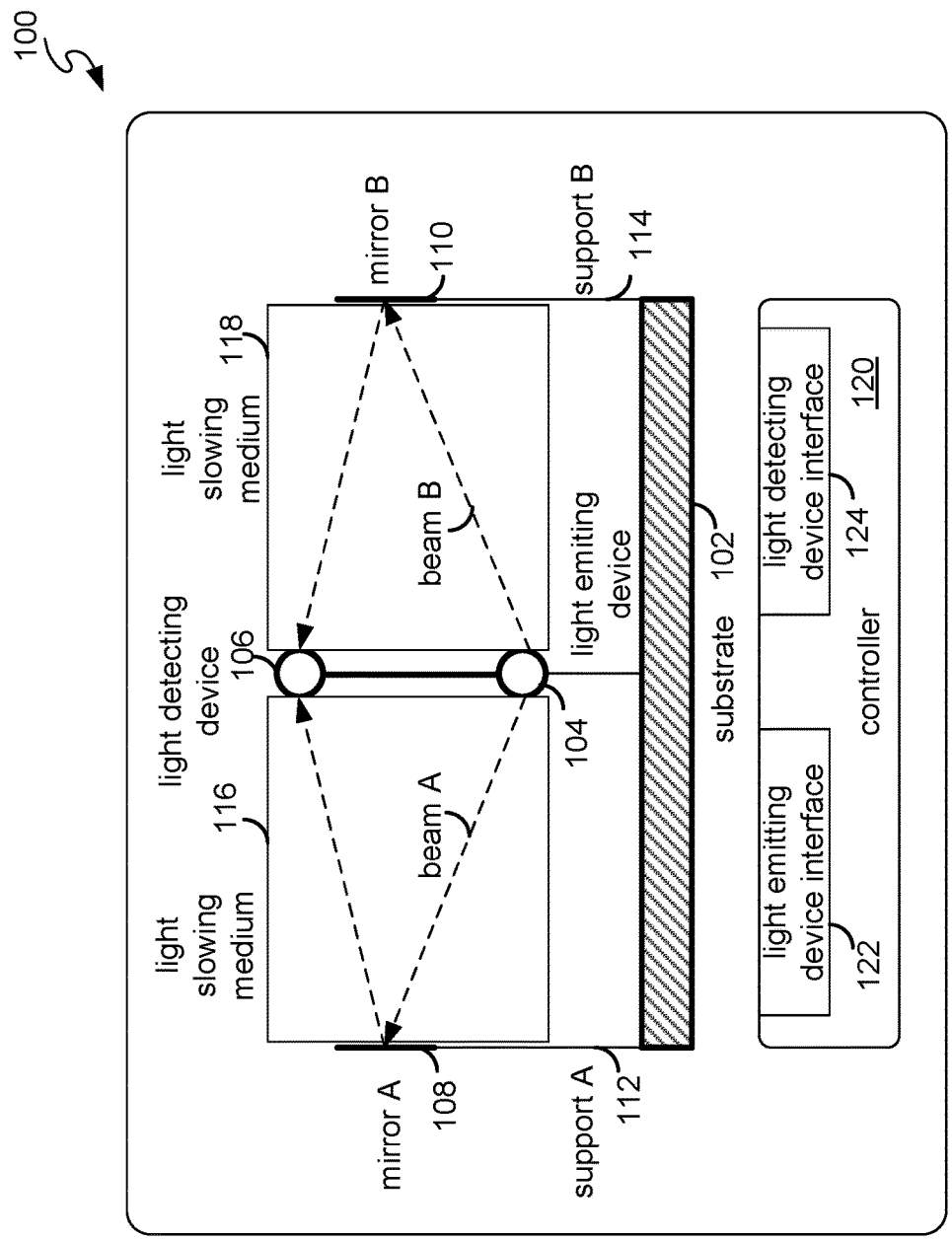
FIG. 1A depicts a device for determining the velocity of an inertial frame, in an embodiment.

FIG. 1A depicts a measuring device for determining the velocity of an inertial frame, in an embodiment. In the figure, the device 100 includes a controller 120 with a light emitting device interface 122 and a light detecting device interface 124, a light-emitting device 104, and a light detecting device 106 mounted at the exact center of the substrate 102 of the measuring device 100, the substrate having length L. Also included are a mirror mounted at one end of the substrate, mirror A 108, and a mirror at the other end of the substrate, mirror B 110 supported respectively by support A 112 and support B 114. The light path between the light-emitting device 104 and each mirror A 108, B 110 is identical to the light path between each mirror A 108, B 110, and the light detecting device 106. Moreover, the light beams in each of the paths traverse a light-slowing medium 116, 118, such as glass, so that the device 100 can have a compact size and detect velocities that are small with respect to the speed of light. Even though in the figure, light beams are depicted as traveling on a 45-degree physical path to aid in drawing the light beam emitter and light beam detector, this need not be the case; however, the physical paths of the light beams are preferably collinear. For example, the light beams can travel on a zero-degree path between the light beam emitter and mirror and between the mirror and light beam detector if the light beam emitter and light beam detector are in the same position on the substrate. All that is required is that the path length of beam A and the path length of beam B be the same.

In some embodiments, a single beam and mirror are used. For example, only beam A and mirror A or only beam B and mirror B are employed on the substrate.

Figure 1B:
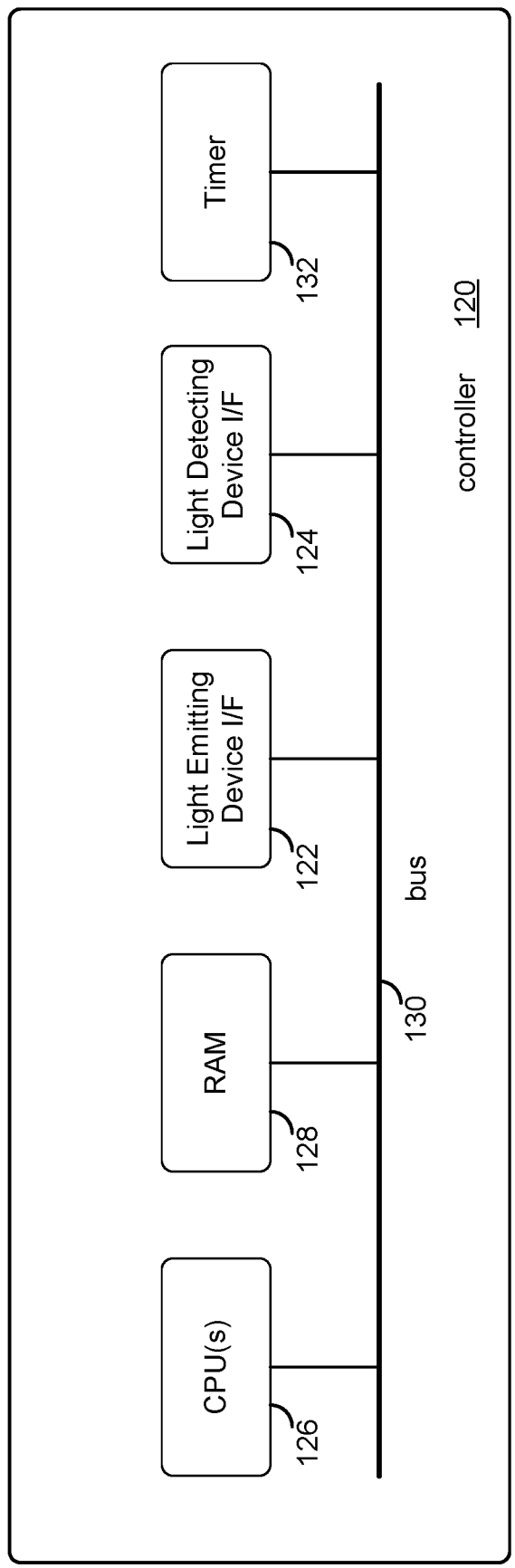
FIG. 1B depicts a controller for the device, in an embodiment.

FIG. 1B depicts the controller for the device, in an embodiment. The controller includes the light emitting device 122 and the light detecting device 124 coupled to a bus 130. Also coupled to the bus 130 are one or more CPUs 126, a RAM 128, and a timer 132. The RAM 128 may be a volatile or non-volatile memory and contains one or more programs for operating the device 100.

Figure 2:
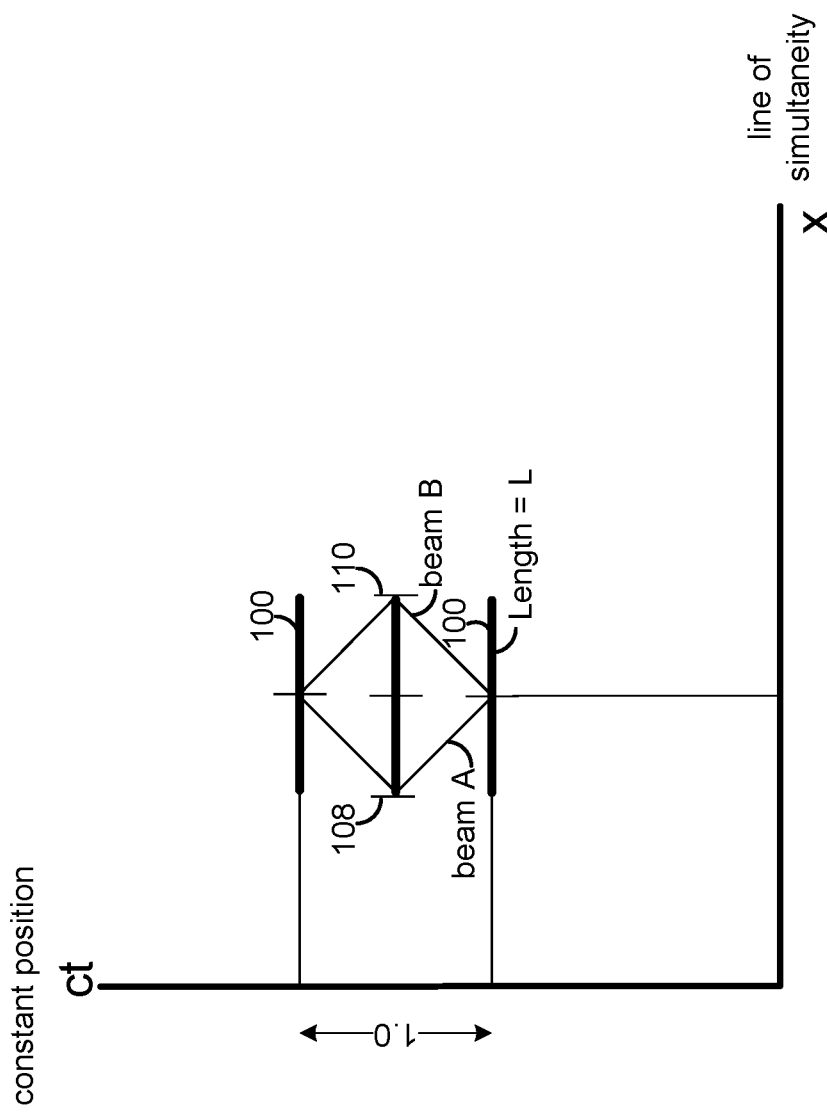
FIG. 2 depicts a time-space diagram for the case when the device is not moving.

FIG. 2 depicts a time-space diagram for the case when the device 100 is not moving. In the diagram, the speed of light, c is assumed to be equal to 1, time is on the vertical axis, and length, x, in one dimension is plotted on the horizontal axis. Thus, the time axis is an axis of constant position, and the x-axis is an axis of constant time or a line of simultaneity. When shown on a time-distance diagram, the axes are scaled so that a beam of light having a speed of unity=(1 unit of distance/1 unit of time) travels on a velocity line at a ±45-degree angle. However, depiction of light moving on a velocity line in the time-distance diagram is not to be confused with the physical path the light beams take in a physical device, which are preferably collinear.

According to the figure, the light beam is emitted by the light beam emitter at the center of the substrate and travels to each mirror at the ends. At the mirrors, the light beam reflects, and each beam moves back towards the light beam detector. When the light beam detector flashes, it indicates that both beams have arrived at the light beam detector. The length of the substrate is set at one (1) unit, and the diagram computes that the time between the emission of the beams and their subsequent detection is 1 unit. Algebraically, the time $t_A$ for beam A to reach the light beam detector is L/c and the time $t_B$ for beam B to reach the light beam detector is also L/c. Because L=1 and c=1, the total round-trip time interval $\tau=t_A=t_B=1$, as shown in the diagram. A frame in which the round trip time interval $\tau$=L/c is hereinafter referred to as the reference frame.

In some embodiments, a single beam, beam A, or beam B is used to implement the device as the measured time for beam A $t_A$ or beam B $t_B$ equals $\tau$.

Figure 3:
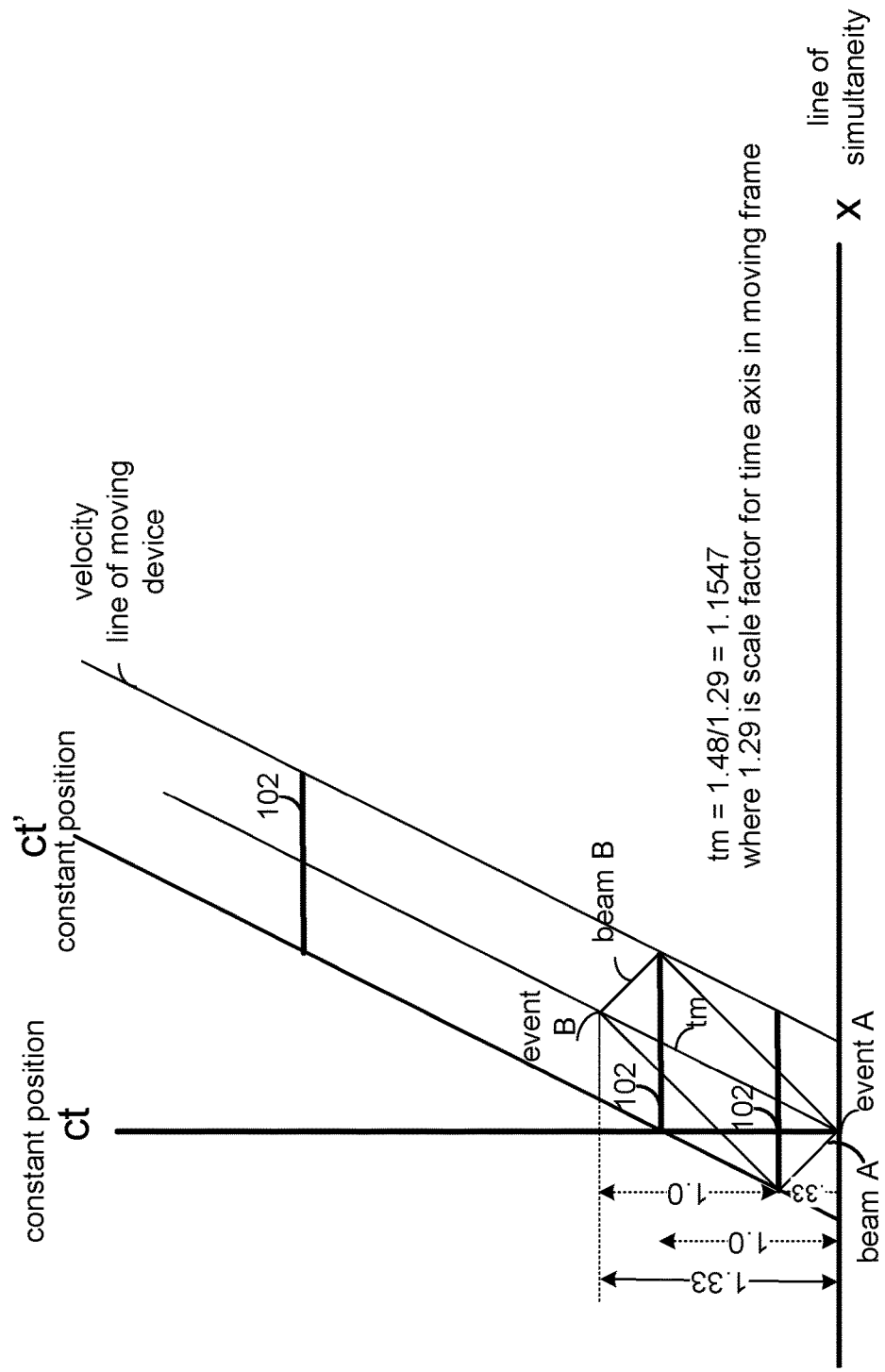
FIG. 3 depicts a time-space diagram for the case when the device is moving with respect to a reference frame.

FIG. 3 depicts a time-space diagram for an example case when the device is moving with respect to a reference frame. In the diagram, the axes are scaled so that c is still equal to 1. Accordingly, a light beam travels on a velocity line at a 45-degree angle, where the velocity line in the graph is not the physical path of the light beam but only a graphical representation of the velocity. Also in the example depicted, the ends and middle of the substrate move at a speed of ½ the speed of light, i.e., 0.5 c=0.5. Device movement means that velocity lines for the ends and middle of the substrate are lines at an angle of arctan(velocity)=arctan(0.5)=0.4636 radians, which is 26.565 degrees rotated to the right from the vertical axis, which is a slope of 0.5, i.e., 1 unit of distance per 2 units of time. Because of universal simultaneity, the line of simultaneity, i.e., the x-axis, is the same as in FIG. 2.

According to the diagram, the time between the emission (event A of the light beams from the light beam emitter and their detection (event B at the light beam detector is 1.33 time units because the substrate is moving at 0.5c. The time for beam A to reach mirror A is 0.33 time units and the time for beam A to reach the light beam detector is 1.0 time unit, for a total $t_A$ of 4/3 time units. The time for beam B to reach mirror B is 1.0 time units, and the time for beam B to reach the light beam detector is 0.33 time units, for a total $t_B$ of 4/3 time units. Thus, the measured time for either beam A or beam B is the same.

Algebraically, the measured total time for beam A to travel to mirror A and return is $$\tau_{measured} = \gamma^2 \frac{L}{c} = \frac{4}{3}\frac{L}{c} = \frac{4}{3}$$

with c=1, L=1. The measured time, $\tau_{measured}$, is the time for an observer of the moving frame in the reference frame. In other words, the measured round trip time $\tau_{measured}$ is $\gamma^2$ times that of the reference frame, which is L/c. The symbol $\gamma^2$ is chosen in anticipation of the computation of the velocity, which is possible because $\gamma^2$ also equals $1/(1-v^2/c^2)$, as explained below. Given this relationship, $v=c\sqrt{1-1/\gamma^2}$. In the example given, $\gamma^2$=4/3, so $v=c\sqrt{1-3/4}=0.50c$.

However, it is established that a clock in the moving frame runs more slowly than a clock in the reference frame by a factor of $\gamma$. Thus, the time measured $t_m$ in the moving frame is $$\tau_m = \tau_{measured}/\gamma = \gamma\frac{L}{c} = \sqrt{4/3} = 1.1547$$

and thus $\gamma$ can be derived from the measurement $\tau_m$ because $$\frac{L}{c}$$

is known. Also, because the relationship $\gamma=1/\sqrt{1-v^2/c^2}$ still holds. The velocity can be computed as $v=c\sqrt{1-1/\gamma^2}$.

As mentioned above, the light beams may travel in a light-slowing medium. When the light beams do so, the detection of velocities that are small compared to c is improved. For example, if the light slowing medium causes c', the speed in the light slowing medium, to equal 0.01c (slowing factor=1/100), then $\gamma^2$ still equals 4/3 when the speed of the substrate is 0.005c. Thus, the greater the slowing of light by the light slowing medium, the more accurately that velocities with a smaller magnitude can be measured. Moreover, with the light-slowing medium, a more compact device can be manufactured because light does not have to travel large distances in the device.

Figure 4:
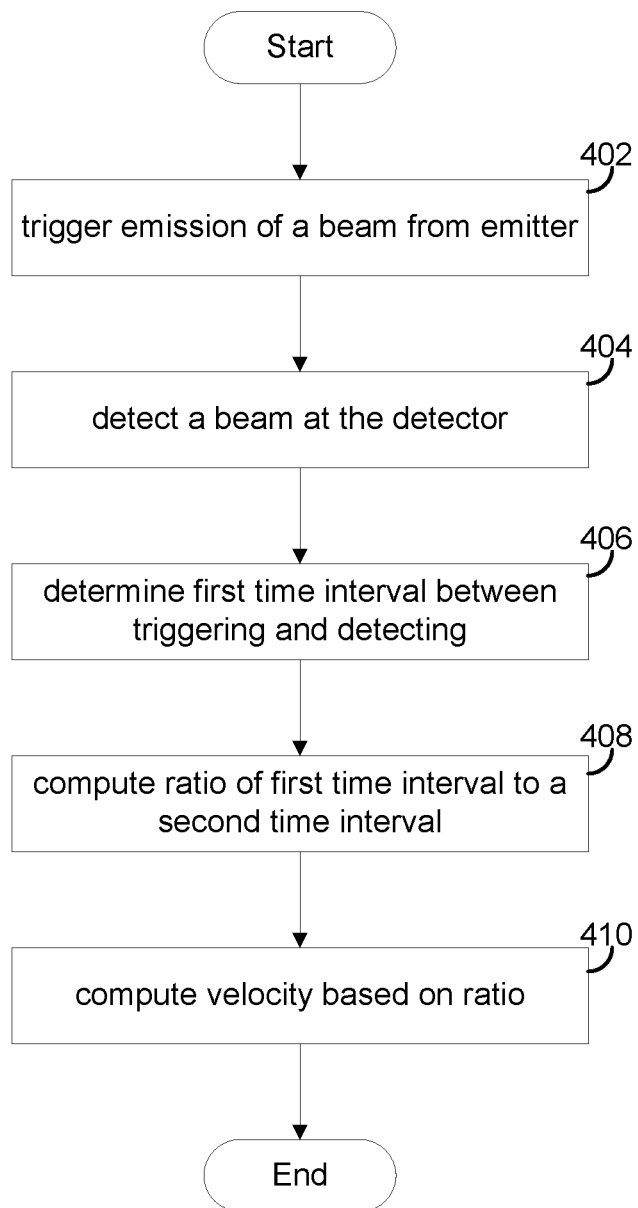
FIG. 4 depicts a flow of operations for carrying out a velocity determination, in an embodiment.

FIG. 4 depicts a flow of operations for carrying out a velocity determination. In step 402, the controller 120 triggers the light beam emitter to emit a beam, say beam A, and starts the timer 132. In step 404, beam A is detected at the light beam detector after having been reflected from their respective mirrors. The detection of the beam notifies the controller to stop the timer 132. In step 406, a first-time interval between the triggering and the detecting is then determined from the timer 132 by the controller 120. The first (measured) time interval is $t_A=\tau_{measured}$ In step 408, the controller 120 computes a ratio, $$\left(\frac{\tau_{measured}}{\gamma}\right)(L/c),$$

of the first time interval to a second time interval, where the second time interval is (L/c). This ratio equals $\gamma$, but $\gamma$ is also related to the components $t_{A1}$, $t_{A2}$ of total round trip time, $t_A=T_{measured}$, where $$t_{A1} = \frac{L}{2}\left(\frac{1}{c+v}\right) \quad (1)$$

is the time interval for beam A to reach mirror A, and $$t_{A2} = \frac{L}{2}\left(\frac{1}{c-v}\right) \quad (2)$$

is the time interval for beam A to reach the light beam detector after reflection from the mirror and $$\tau_{measured} = t_{A1} + t_{A2} = \left(\frac{L}{c}\right)\left(\frac{1}{1-\frac{v^2}{c^2}}\right) \quad (3)$$

(Similar equations apply to beam B so that either beam A or beam B can be used for the measurement)
Therefore, from inspection of equation 3 above, $$\gamma^2 = \left(\frac{1}{1-\frac{v^2}{c^2}}\right) \quad (4)$$

In step 410, the controller 120 computes the velocity of the moving substrate v as $c\sqrt{1-1/\gamma^2}$ which follows from equation 4.

Thus, the velocity of a moving frame with respect to a reference frame is determined.

In another embodiment, a differential velocity can be determined by determining the velocity $v_1$ (from a time measurement as described above) of a second frame with respect to a first reference frame and then determining the velocity $v_2$ of a third frame moving with respect to the first reference frame. The difference $v_2-v_1$ is the velocity of the third frame with respect to the second frame. For example, the first reference frame has $\gamma^2=1$, so that the frame is not moving. The second frame has $\gamma^2=9/8$ based on a time measurement in the second frame, so that its speed is 1/3 c. The third frame has $\gamma^2=4/3$ based on a time measurement in the third frame, so that its speed relative to the first reference frame is 0.5c. The difference in speed is 0.5c−0.3c=0.2c, which is the speed (differential velocity) of the third frame relative to the second frame for collinear motion among the frames.

In conclusion, because time is the same in both the frame of the moving substrate and the reference frame, the velocity of the moving frame can be measured by an experiment entirely within the moving frame.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for determining a velocity of an inertial frame in the inertial frame moving with respect to a reference frame, the method comprising:
   triggering at a first instant in time emission of a light beam from a site on a substrate in the inertial frame, wherein the site is at a position halfway between ends of the substrate, and wherein a mirror is disposed on the substrate at one end of the substrate and the emitted light beam traverses a path towards the mirror; and
   detecting a second instant in time at which the emitted light beam returns to the site after being reflected from the mirror;
   determining a first time interval which has elapsed between the first and second instants in time;
   computing a ratio of the first time interval to a second time interval; and
   calculating the velocity based on the ratio.

2. The method of claim 1, further comprising:
   triggering at the first instant in time emission of another light beam from the site, wherein another mirror is disposed on the substrate at the other end of the substrate and the other emitted light beam traverses a path towards the other mirror;
   detecting a third instant in time at which the other emitted light beam returns to the site after being reflected from the other mirror; and
   determining a third time interval which has elapsed between the first instant in time and the third instant in time, wherein the third time interval equals the first time interval.

3. The method of claim 1,
   wherein the emitted light beam traverses a medium and the other emitted light beam traverses another medium identical to the medium; and
   wherein the medium and the other medium are media in which light beams travel at a velocity slower than light beams traveling in no medium.

4. The method of claim 3, wherein the media in which light travels at the slower velocity are glass media.

5. The method of claim 3,
wherein a slowing factor is a ratio of the slower velocity to the velocity of the light beam in no medium; and
wherein a smaller magnitude of the velocity of the inertial frame is detectable when the slowing factor is larger.

6. The method of claim 1, wherein the second time interval is a time between the first instant in time and the second instant in time when the velocity of the inertial frame is zero.

7. The method of claim 1, wherein the ratio of the first time interval to the second time interval is $\gamma^2$, where $\gamma^2=1/(1-v^2/c^2)$, c is the speed of light and v is the velocity of the moving inertial frame.

8. The method of claim 1, wherein calculating the velocity includes computing a quantity $c\sqrt{1-1/\gamma^2}$, where $\gamma^2=1/(1-v^2/c^2)$, c is the speed of light and v is the velocity of the moving inertial frame.

9. An apparatus for determining a velocity of a substrate moving with respect to a reference frame, the apparatus comprising:
the substrate;
a light beam emitter disposed on the substrate at a site that is halfway between ends of the substrate;
a light beam detector disposed on the substrate at the site of the light beam emitter;
a mirror disposed on one end of the substrate; and
a controller residing on the substrate and coupled to the light beam emitter and light beam detector;
wherein the controller is configured to trigger at a first instant in time the light beam emitter to emit a light beam that travels to the mirror, the emitted light beam reflecting from the mirror at a second instant in time; and
wherein the controller is further configured to calculate the velocity of the moving substrate with respect to the reference frame based on the controller in the moving substrate determining a first time interval between the first instant in time and the second instant in time and comparing the first time interval to a second time interval.

10. The apparatus of claim 9,
wherein the light beam emitter, when triggered at the first instant in time by the controller, emits another light beam that travels to another mirror disposed at the other end of the substrate, the other emitted light beam reflecting from the other mirror and being detected at a third instant in time by the light beam detector;
wherein the controller is further configured to measure a third time interval between the first instant in time and the third instant in time,
wherein the third time interval equals the first time interval.

11. The apparatus of claim 9, wherein the second time interval is a time between the first instant in time and second instant in time when the velocity of the substrate is zero.

12. The apparatus of claim 9, further comprising:
a first medium, wherein the light beam travels to and from the mirror in the first medium; and
a second medium, wherein the other light beam travels to and from the other mirror in the second medium which is identical to the first medium.

13. The apparatus of claim 12, wherein the medium and the other medium are media in which the light beams travel at a velocity slower than light beams traveling in no medium.

14. The apparatus of claim 13, wherein the media in which light beam travels at the slower velocity are glass media.

15. The apparatus of claim 9, wherein a ratio of the first time interval to the second time interval is $\gamma^2$, where $\gamma^2=1/(1-v^2/c^2)$, c is the speed of light and v is the velocity of the moving substrate.

16. The apparatus of claim 9, wherein calculation of the velocity includes computing a quantity $c\sqrt{1-1/\gamma^2}$, where $\gamma^2=1/(1-v^2/c^2)$, c is the speed of light and v is the velocity of the moving substrate.

17. A non-transitory computer-readable medium comprising instructions executable in a computer system, wherein the instructions, when executed in the computer system, cause the computer system to carry out a method for determining a velocity of an inertial frame moving with respect to a reference frame, the method comprising:
triggering at a first instant in time emission of a light beam from a site on a substrate in the inertial frame, wherein the site is at a position halfway between ends of the substrate, and wherein a mirror is disposed on the substrate at one end of the substrate and the emitted light beam traverses a path towards the mirror; and
detecting a second instant in time at which the emitted light beam returns to the site after being reflected from the mirror;
determining a first time interval which has elapsed between the first and second instants in time;
computing a ratio of the first time interval to a second time interval, the second time interval being a time between the first instant in time and the second instant in time when the velocity of the inertial frame is zero; and
calculating the velocity based on the ratio.

18. The non-transitory computer-readable medium of claim 17, wherein the method further comprises:
triggering emission at the first instant in time of another light beam from the site, wherein another mirror is disposed on the substrate at the other end of the substrate and the other emitted light beam traverses a path towards the other mirror;
detecting a third instant in time at which the other emitted light beam returns to the site after being reflected from the other mirror; and
determining a third time interval which has elapsed between the first instant in time and the third instant in time, wherein the third time interval equals the first time interval.

19. The non-transitory computer-readable medium of claim 17, wherein the ratio of the first time interval to the second time interval is $\gamma^2$, where $\gamma^2=1/(1-v^2/c^2)$, c is the speed of light and v is the velocity of the moving inertial frame.

20. The non-transitory computer-readable medium of claim 17, wherein calculation of the velocity includes computing a quantity $c\sqrt{1-1/\gamma^2}$, where $\gamma^2=1/(1-v^2/c^2)$, c is the speed of light and v is the velocity of the moving inertial frame.

\* \* \* \* \*